United States Patent [19]

Bolgiano

[11] 4,138,299

[45] Feb. 6, 1979

[54] PROCESS UTILIZING A PHOTOPOLYMERIZABLE AND MOISTURE CURABLE COATING CONTAINING PARTIALLY CAPPED ISOCYANATE PREPOLYMERS AND ACRYLATE MONOMERS

[75] Inventor: Nicholas C. Bolgiano, Lancaster, Pa.

[73] Assignee: Armstrong Cork Company, Lancaster, Pa.

[21] Appl. No.: 863,844

[22] Filed: Dec. 23, 1977

[51] Int. Cl.$^2$ .................... C08F 8/00; C08G 18/00
[52] U.S. Cl. .................. 204/159.16; 204/159.19; 204/159.22; 204/159.23; 260/859 R; 427/44; 427/54; 428/425; 428/443
[58] Field of Search .............. 204/159.16, 159.19, 204/159.22, 159.23; 427/44, 54; 260/859 R

[56] References Cited

U.S. PATENT DOCUMENTS

| | | | |
|---|---|---|---|
| 3,935,330 | 1/1976 | Smith et al. | 427/41 |
| 4,025,407 | 5/1977 | Chang et al. | 204/159.14 |

Primary Examiner—Richard B. Turer

[57] ABSTRACT

A liquid radiation and moisture curable 100% reactive coating which cures to yield a clear, tough, glossy abrasion-resistant cured coating is described. The radiation and moisture curable 100% reactive coating composition comprises: 15 to 60 parts by weight acrylate diluents; and 40 to 85 parts by weight of isocyanate terminated urethane prepolymers formed by reacting a mixture of polyester diols and triols with excess aliphatic diisocyanate to form —NCO terminated prepolymer and then reacting the —NCO terminated prepolymers with sufficient hydroxy acrylate to cap between about 5% and 15% of the available —NCO sites to form addition polymerizable ethylenically unsaturated sites and a photoinitiator when light is the radiation source. When the coating is exposed to a source of radiation, the ethylenically unsaturated monomers and prepolymers polymerize to develop a tack-free surface coating, after which the partially reacted coating is further polymerized through the isocyanate terminated prepolymer portion by moisture curing to form the fully cured tough, glossy, abrasion-resistant coating. The coatings of this invention are particularly well adapted for providing a decorative thermoplastic surface covering with a clear, tough, glossy, abrasion-resistant, light-stable, no-wax wear layer.

8 Claims, No Drawings

PROCESS UTILIZING A PHOTOPOLYMERIZABLE AND MOISTURE CURABLE COATING CONTAINING PARTIALLY CAPPED ISOCYANATE PREPOLYMERS AND ACRYLATE MONOMERS

DESCRIPTION OF THE PRIOR ART

In order to provide decorative thermoplastic floor coverings with tough, glossy, abrasion-resistant coatings which are semi-permanent such that they do not require the home application of wax or polymeric compositions to retain their gloss, the resilient flooring industry has developed urethane coatings which are factory applied. Although some of these coatings have been satisfactory as to gloss and wear characteristics, one drawback is that these coatings are based on solvent systems and require the utilization of large amounts of energy to drive off the solvents as well as complicated solvent recovery systems. It has been proposed to provide coating compositions which may be cured on exposure to radiation and/or light, which coatings contain essentially 100% active ingredients together with conventional photopolymerization catalysts or initiators, as coatings for application to resilient thermoplastic floor products. These would hopefully overcome the disadvantages associated with solvent based coating systems. For example, U.S. Pat. No. 3,056,760 discloses a 100% reactive terminally unsaturated polymer coating material which may be photopolymerized advantageously with the use of a catalyst and suggests the coating may be used for protectively coating articles such as linoleum. An even earlier reference, U.S. Pat. No. 2,413,973, recognized that certain photocurable coating compositions could be used to upgrade articles made of a wide variety of resins including thermoplastics. Still further radiation curable urethane modified binders are described in U.S. Pat. Nos. 3,891,523 and 3,509,234, and the application of photopolymerizable coatings to vinyl asbestos tile is described in U.S. Pat. Nos. 3,924,023.

SUMMARY OF THE INVENTION

In view of the above, it seemed readily apparent that prime candidate materials for coatings would be found in the photopolymerizable coating art. Such coatings, when applied to resilient thermoplastic decorative floor coverings, should evidence superior resistance to soiling and staining and evidence superior scratch and abrasion resistance. They should be of a semi-permanent nature and should have the obvious low energy requirements needed for production requirements. A screening of a considerable number of the most advanced photopolymerizable coatings available failed to realize the apparent potential and, for one reason or another, such coatings were found deficient due to the stringent requirements placed on a glossy, semi-permanent, coating which is highly resistant to scratching and abrasion under normal conditions of floor covering usage. These disadvantages have now been overcome by utilizing the coating composition of this invention which combines in a 100% reactive system, a monomer and prepolymer system which is partially curable by a photopolymerization curing step with the remainder of the coating being isocyanate terminated prepolymer which is moisture curable through the terminal -NCO groups to form tough urea cross-links in the cured film. This coating yields a tough, glossy, clear coating which is resistant to soil and staining and is both abrasion and scratch resistant. It can be considered to be semi-permanent; thus providing a nowax floor requiring little of the maintenance associated with conventional resilient thermoplastic decorative vinyl floor coverings over a long lifetime.

Description of the Preferred Embodiment

Although radiation sources such as electron beams may be used to cure the coatings, the most popular method in use today is the use of a ultraviolet light source and a photoinitiator as a source of free radicals in radiation curing. Innumerable resin systems have been proposed as ultraviolet light curable coating systems. Most of these photopolymerizable coatings are essentially 100% reactive and when used as coatings, cure to a hard abrasion resistant film. Some of these coatings are based on acrylate type systems which are polymerized through the unsaturated acrylate groups on photopolymerization. It has been proposed, for example, in U.S. Pat. No. 3,509,234 to include urethane type prepolymers in the 100% reactive system wherein the isocyanate terminated prepolymer is subsequently reacted with a hydroxyacrylate to provide the unsaturated site for cross-linking with acrylate diluents during the photopolymerization step. Such systems form a durable film on curing by either photopolymerization or ionizing radiation and are resistant to conventional service conditions. However, although abrasive resistant to a considerable degree, films of the prior art in general have a fatal drawback in that the original glossy surface, when utilized on a floor, is readily scratched and sometimes even gouged under extreme wear conditions experienced in such an environment. To the housewife, when considering a no-wax floor which is offered as a permanent installation, this is a serious drawback since such scratching reduces the gloss in a relatively short period of time.

I have discovered that a 100% reactive system that can be used as a successful coating for resilient thermoplastic floor products. The urethane prepolymer which is present together with the acrylate diluents in the reactive coating is essentially NCO terminated, although a small portion of the —NCO groups are capped with a monohydroxy acrylate to provide a limited degree of unsaturation at certain points of the prepolymer backbone structure. Generally speaking, a mixture of diols and triols are reacted with an excess of diisocyanate to form the NCO terminated prepolymer. This reaction is carried out in the presence of acrylated diluents. To this mixture a small portion of the monohydroxy acrylate is added and reacted with a portion of the available —NCO groups on the isocyanate terminated prepolymer portion to form unsaturated sites on a portion thereof. The conventional photoinitiator is added to this mixture and the liquid thus formed is coated by a conventional means onto the decorative thermoplastic vinyl flooring product, either in tile or sheet form.

The coated sheet or tile is then passed beneath an ultraviolet light source such as a medium pressure mercury lamp, and the unsaturated portion of the coating is cured and cross-linked. The partially cured coating is then exposed to moisture by aging, which further chain extends and cross-links the coating by reaction of water with the —NCO groups. The combination of the photopolymerized polymer component and the polyurethane component in the fully cured coating yields the desired tough, glossy, mar-resistant film.

In order to form then liquid coating which may be factory applied and cured to form a clear film having the desired properties, I have found that it is necessary to base my polyurethane forming prepolymer component on a combination of polyester diols and triols reacted with excess aliphatic diisocyanate to form —NCO terminated prepolymers. The prepolymers are the partially capped by reaction with a sufficient amount of a monohydroxy acrylate to cap between about 5% and 15% of the available —NCO groups.

Sufficient acrylate diluents having no reactive hydroxyl groups are used in the coating to provide a liquid of desired viscosity which, when subjected to a conventional photopolymerizable source, will react to give a non-tacky film. Generally, from 15 to 60 parts by weight of acrylate diluents are utilized with 40 to 85 parts by weight of the partially capped —NCO terminated prepolymers together with a suitable photoinitiator when preparing coatins in accordance with this invention. At least 10% by weight of the acrylate diluent is a diacrylate or triacrylate.

Examples of acrylates utilizable in the coating compositions of this invention include mono, di and triacrylates such as 2-ethylhexyl acrylate, phenoxyethyl, acrylate, isodecyl acrylate, ethoxyethyl acrylate, benzyl acrylate, tetraethylene glycol diacrylate, 1,6hexanediol diacrylate, trimethylol propane triacrylate, and lauryl methacrylate.

The preferred polyester triol is formed by reacting one mole of glycerol with 3 moles of dicarboxylic acids and 3 moles of aliphatic diols. Preferably, the triol will have a molecular weight of about 500 to 1,000 and a hydroxyl number between about 160 and 330. As the diol, a polycaprolactone diol, prepared, for example, as described in U.S. Pat. No. 2,914,556, is generally preferred, although polyester diols such as 1,6 hexane dioladipate may also be used. A polyester diol having a molecular weight between about 350 and 1000 and a hydroxyl member between about 110 and 320 is preferred.

As described above, the polyester diol and triol mixture is reacted with an excess of an aliphatic diisocyanate to form fully —NCO terminated prepolymers. Examples of aliphatic diisocyanates utilizable in the practice of this invention include hexamethylene diisocyanate; 1,4bis(betaisocyanato ethyl) cyclohexane; isophorone diisocyanate; and 4,4' diisocyanato dicyclohexylmethane. Generally, the latter is preferred.

Monohydroxy acrylates that may be used to partially cap the —NCO terminated prepolymers include 2-hydroxymethyl acrylate, 2-hydroxyethyl methacrylate, and 2-hydroxypropyl acrylate.

As the photoinitiator, any of the compounds well known in the art for promoting free radical polymerization using conventional ultraviolet light sources may be used in the coating. They should be present in the formulations at least to the extent of 0.5% and preferably 1.0% or more. Examples of such photoinitiators are aromatic ketones such as benzophenone and benzoin ethers such as benzoin isobutyl ether. Also conventional catalysts for promoting the moisture cure of the polyurethane should be added, for example, the dialkyl tin salts of a long chain fatty acid such as dibutyltin dilaurate in small amounts such as 0.1% to 0.5%. Such catalysts are also used in forming the —NCO terminated prepolymer. Conventional light stabilizers are also advantageously added.

The following examples will serve to more fully illustrate specific embodiments of this invention.

EXAMPLE 1

The following reactants were charged into a reaction vessel.

| Ingredients | Grams |
|---|---|
| Triol (Hooker F-1017-180) Reaction product of 1 mole glycerol, 3 moles of a 7/3 mixture of adipic acid and isophthalic acid, and 3 moles 1,6 hexanediol MW 960; Hydroxyl No. 175 | 93 |
| Diol (Union Carbide PCP0200) A polycaprolactone diol having a MW of 540 and a Hydroxyl No. of 207 | 58 |
| 2-ethylhexylacrylate | 94 |
| Hexanediol diacrylate | 62 |

132.3 grams of 4,4' diisocyanato dicyclohexylmethane and 0.4 grams of dibutyltin dilaurate catalyst were then added and the mixture reacted at 45° C. to 50° C. After the reaction has proceeded for approximately 45 minutes, 5.8 grams of 2-hydroxyethylacrylate was added continuing the stirring and heating for an additional two hours at which point the isocyanate functionality is constant.

Based on 100 parts by weight of the reaction mixture which is a mixture of the partially capped isocyanate terminated urethane prepolymer and the acrylate diluent mixture, 2.0% by weight of benzophenone photoinitiator is added together with 0.1% by weight of polyethylene glycol siloxane (Dow Corning DC472) and ½% by weight of dibutyltin dilaurate catalyst.

At this point, the coating thus formed has a viscosity of approximately 9,000 centipoises at room temperature and is comprised of 35% reactive diluents and 65% partially acrylate capped urethane prepolymer.

A commercial vinyl asbestos tile was conveyed under conventional coating mechanisms such as a knife, roll or curtain coater, in this instance, under a curtain coater, which applied 2 to 2½ mils of coating overall on the tile product. The coating was first heated to about 130° F. to reduce the viscosity.

The coated tile was passed under four, in line, 200 watt per inch, medium pressure mercury lamps at a speed of about 16 feet per minute to partially polymerize the coating by photopolymerizing the ethylenically unsaturated components of the coating formulation. Surprisingly, there was no necessity to use an inerting blanket during the ultraviolet light cure. The coating on the tile, which is tack-free at this point, although not tough and mar-resistant, is then given a final moisture cure by allowing the coating to age at room conditions whereby the unreacted isocyanate end groups in the coating react with moisture and chain extend and crosslink to form the final durable, tough, glossy clear coat. At average room conditions, the coating develops its optimum properties within about 3 weeks.

A series of coatings, applied and cured as above-described, were evaluated for a range of concentrations of 2-hydroxyethyl acrylate. In the series, the 2-hydroxyethyl acrylate content was varied in the coating formulation of Example 1 from 0% to 40% (calculated on the basis of the number of equivalents of acrylate per equivalents of free —NCO's in the prepolymers). Example 1 above has a 10% acrylate content on this basis. Results of varying acrylate levels on physical properties in the fully cured coatings is reported in Table I.

Table I

The Effect of Varying 2HEA Content on Physical Properties, Tg, and Loss of Gloss

| 2HEA (%) | Tensile (psi) | Elong. (%) | Tg (DSC) | Gloss | | |
|---|---|---|---|---|---|---|
| | | | | 1 hr | 2 hr | 3 hr |
| 0 | 2598 | 59.3 | −17 to +24 | 11 | 25 | 43 |
| 5 | 3490 | 74.3 | −12 to +25 | 13 | 34 | 46 |
| 10 | 2576 | 56.0 | −12 to +29 | 10 | 26 | 44 |
| 15 | 3813 | 77.1 | −12 to +39 | 14 | 33 | 52 |
| 20 | 2913 | 56.5 | −9 to +35 | 11 | 32 | 54 |
| 40 | 2813 | 49.0 | −8 to +42 | 15 | 41 | 61 |

The gloss reduction data given above shows that, at about 15% 2-hydroxyethyl acrylate content, the 3 hours gloss reading begins to become large. At higher levels, the loss of gloss is progressively worse. The loss of gloss was determined by subjecting tile samples to an accelerated traffic wear test using a rotating abrasive wheel. When the 2-hydroxyethyl acrylate was omitted from the formulation, the film was too tacky after the U-V cure, and this made handling of the coated tile difficult.

Example 2

| Ingredients | Grams |
|---|---|
| Triol of Example 1 | 76.7 |
| 1,6 hexanedioladipate (molecular weight 528; hydroxyl number 213) | 70.0 |
| 2-ethylhexyl acrylate | 92.5 |
| Hexanediol diacrylate | 61.5 |

The above reactants were charged into a reaction vessel and 132.3 grams of 4,4′ diisocyanato dicyclohexylmethane and 0.4 grams of dibutyltin laurate were added and reacted as in Example 1. The 5.8 grams of 2-hydroxyethyl acrylate was then added and reacted following the procedure of Example 1.

Based on 100 parts by weight of the reaction mixture, 2% by weight benzophenone, 0.2% 2,6-ditertiarybutyl paracresol antioxidant and 0.4% acrylic acid are added. At this point, the coating has a viscosity of about 4800 centipoises at 24° C. The coating is heated to reduce the viscosity and applied to a vinyl asbestos tile substrate and cured as described in Example 1. After aging for about three weeks, the coating cured to form durable, tough, mar-resistant clear film.

What is claimed is:

1. In a process wherein a liquid coating is subjected to a combined radiation and moisture cure to yield a tough mar-resistant glossy film, the improvement comprising using a liquid coating consisting essentially of:
   a. 15 to 60 parts by weight of acrylate diluents with 10 to 90% by weight being monoethylenically unsaturated and the balance di or tri-ethylenically unsaturated, said diluents have no reactive hydroxyl groups; and
   b. 40 to 85 parts by weight —NCO terminated prepolymers prepared by reacting a mixture of 20 to 80% by weight polyester diol and 20 to 80% by weight polyester triol with an excess of an aliphatic diisocyanate, said prepolymer mixture being further reacted with sufficient hdyroxy acrylate to cap 5 to 15% of the available —NCO groups.

2. A process in accordance with claim 1 wherein said liquid coating contains sufficient photoinitiator to initiate photopolymerization and yield a non-tacky film when said coating is subjected to a photopolymerization source.

3. A process in accordance with claim 2, in which the polyester diol has a molecular weight of 350 to 1,000 and a hydroxyl number of between about 110 and 320, and in which the polyester triol has a molecular weight of about 500 to 1,000 and a hydroxyl number of between about 160 and 330.

4. A process in accordance with claim 3 in which the acrylate diluents are a mixture of 2-ethylhexyl acrylate and 1,6-hexane dioldiacrylate.

5. A process in accordance with claim 3 in which the hydroxy acrylate reacted with said —NCO terminated prepolymers is 2— hydroxyethyl acrylate, said hydroxy acrylate being sufficient in amount to react with about 10% of the available —NCO groups.

6. A process in accordance with claim 3 in which the diisocyanate is 4,4′-diisocyanato dicyclohexyl methane.

7. A process in accordance with claim 4 in which the weight ratio of acrylate diluents to prepolymer mixture is about 35 parts by weight to 65 parts by weight.

8. A process in accordance with claim 7 in which the triol is the reaction product of 1 mole glycerol, 3 moles of a 7/3 mixture of adipic and isophthalic acids, and 3 moles 1,6-hexane diol, the diol is a polycaprolactone diol having a molecular weight of between 350 and 1,000 and a hydroxyl number of between 110 and 320, and wherein the diiscoyanate is 4,4′-diisocyanato dicyclohexyl methane.

* * * * *